July 26, 1949.  J. N. WILLIAMS  2,477,470
TRANSPARENCY MOUNT
Filed March 5, 1948
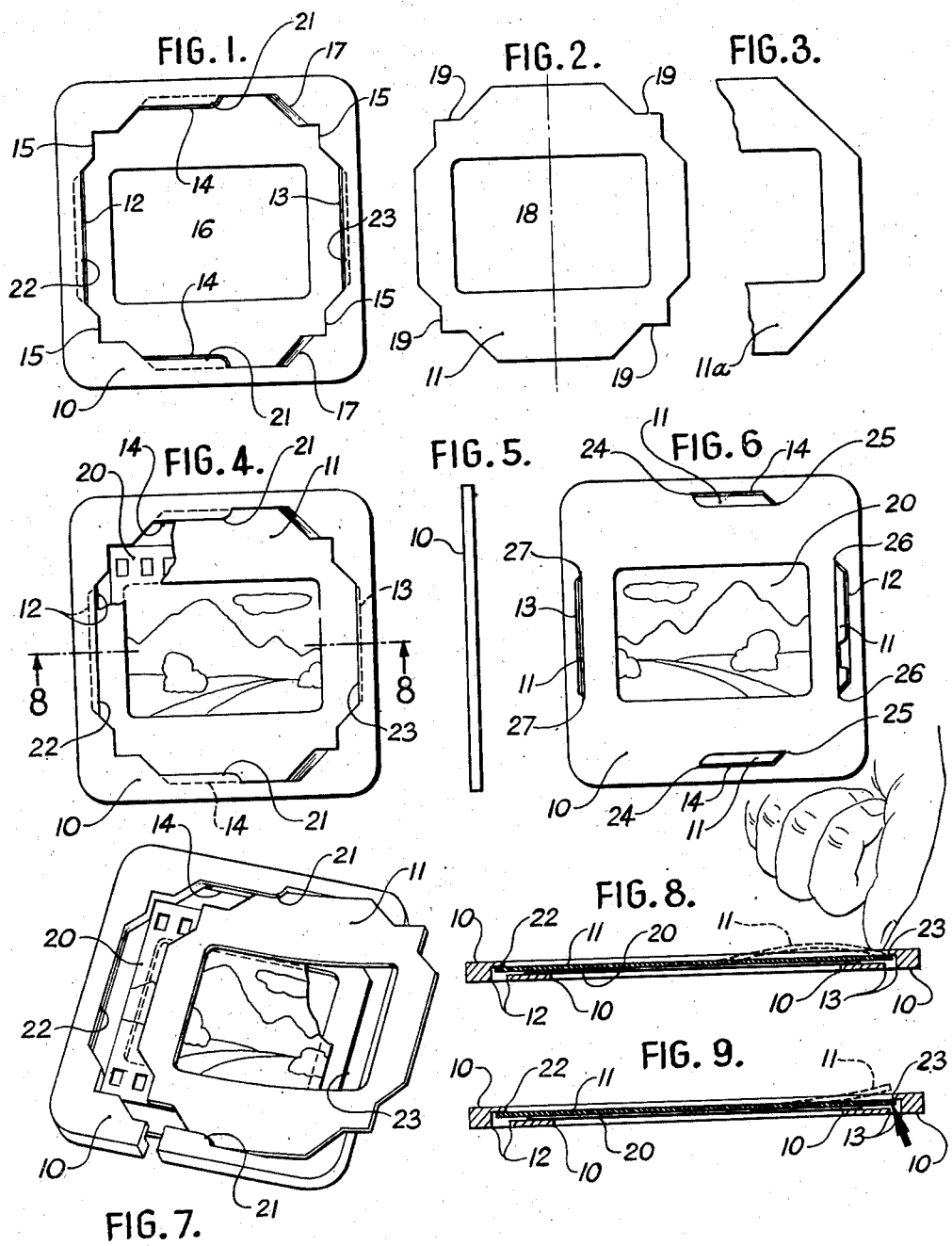
INVENTOR
John Nelson Williams Patented July 26, 1949

2,477,470

UNITED STATES PATENT OFFICE 2,477,470

TRANSPARENCY MOUNT

John Nelson Williams, New York, N. Y.

Application March 5, 1948, Serial No. 13,299

4 Claims. (Cl. 40—158)

The present invention relates to a mount for holding transparencies for viewing or for use in still projectors.

It has been the previous practice to mount transparencies, which are usually in the form of thin and flexible photographic films, in mounts made of a variety of materials such as cardboard, metal, plastic or glass all of which are fabricated by differing processes and all of which present disadvantages which it is the object of this invention to overcome.

Cardboard mounts suffer from the inherent disadvantage of their material in that they become easily bent and the picture aperture edges become frayed. Metal mounts are more durable but tend to have sharp edges, to require expensive manufacturing procedures or to present an unpleasant irregular outer surface. The chief disadvantage of glass mounts is their liability of breakage, thus ruining the film. In addition many of these various mounts used in previous practice have had the disadvantages of being too heavy, too thick in section, too expensive to manufacture for distribution at a low price, require tedious assembly of the film in the mount by the user, and hold the film too securely in position in the mount so that the film when heated by the projector has no possibility of expanding in the plane of the film but instead tends to curl or buckle thus throwing the image out of focus.

Transparency mounts made of thermoplastic material overcome many of the disadvantages just cited. However, mounts of this type used in previous practice have either presented expensive laminating or other manufacturing assembly problems or required heat and pressure to be applied for the final mounting operation or required two separate molded parts for the mount or held the film too firmly and securely in position in the mount, allowing no room for expansion when heated.

Therefore, one object of the present invention is the provision of a transparency mount made of two parts, the frame portion being formed of molded plastic and a sliding insert portion being provided which is die-cut or stamped from sheet material, preferably plastic sheet, the mount composed of these two simple parts requiring no further intricate assembly operations either in the manufacturing process or in the final mounting of the film transparency in the film mount by the user.

Another object is to provide a mount of the type set forth in which the film transparency can be instantly mounted in the mount and will be held securely therein while still having ample room for expansion in the plane of the film when heated, and in which the film transparency can be instantly unmounted at will, allowing another transparency film to be instantly mounted in the mount if so desired.

Another object is to provide a mount of the type set forth which takes advantage of the characteristics of molded and stamped or die-cut materials, especially plastic materials, to be rapidly and inexpensively fabricated, the finished articles requiring no further processing and presenting a smooth finished appearance, being durable, rigid and light in weight.

Another object is to provide a mount of the type set forth in which the molded frame and stamped or die-cut insert may be made of materials available in a large variety of colors, thus adding a pleasing appearance to the finished mount.

Another object is to provide a mount of the type set forth which takes advantage of the characteristic of suitable sheet material, preferably plastic sheet, of remaining perfectly flat when no force is applied to it, but whose flexibility allows it to be easily bent when desired, this flexibility being used in the present invention during the process of mounting a film transparency in the mount, or of removing said transparency from the mount.

Another object is to provide a mount of the type set forth consisting of a molded thermoplastic frame portion and including an irregularly shaped recess in the front face thereof, part of said recess being in the form of four corners disposed to receive and position the four corners of the film transparency, the remaining portion of the irregularly shaped recess being designed to provide four under-cut grooves (each groove running parallel to each side of the frame) into which a properly shaped insert made of sheet material is slidden until it is securely engaged in three of the grooves, the protruding end of said insert then being bowed and the edge bent downward to slide into the fourth groove thus holding the transparency securely in position in the mount.

Further and other objects of the present invention will be hereinafter set forth in the accompanying specification and claims and shown in the drawing which illustrates a preferred embodiment of the invention and the principle thereof. Other embodiments of the invention employing the same or equivalent principle may be used and structural changes made by those skilled in the art without departing from the present invention and within the spirit of the appended claims.

In the drawings:

Fig. 1 is a front elevational view of the molded thermoplastic frame portion of the mount, showing the irregularly shaped recess with the four film-positioning corners and the four under-cut grooves.

Fig. 2 is an elevational view of the insert portion of the mount, which is symmetrical about its vertical center-line and is stamped or die-cut from suitable sheet material, preferably plastic sheet.

Fig. 3 is a partial elevational view showing an alternate form in which the insert portion of the frame shown in Fig. 2 may be cut, the variation consisting solely of the elimination of the four extending right-angle corners 19 of the insert as shown in Fig. 2, thus permanently exposing the four corners of the film transparency when completely assembled in the mount. In all other respects the insert 11a as shown partially in Fig. 3 is identical with the insert 11 as shown in Fig. 2.

Fig. 4 is a front elevational view of a completely assembled mount constructed in accordance with the present invention, showing a transparency in position within the mount.

Fig. 5 is an end elevational view of the assembled mount shown in Fig. 4, and is also a typical view of all four end views of the mount.

Fig. 6 is a rear elevational view of the assembled mount shown in Figs. 4 and 5.

Fig. 7 is a front perspective view of a partially assembled mount, with the film transparency set in position in the frame portion of the mount and the insert portion of the mount being shown midway in the act of sliding into the under-cut grooves of said frame portion, the assembly of the mount being completed when the insert is slidden farther from right to left as shown until it securely engages the under-cut groove on the left side of the frame, the final assembly operation being shown in:

Fig. 8, which is an enlarged sectional view of the assembled mount as shown in Fig. 4, and which shows the manner in which the right-hand side of the insert is bowed and the edge bent downward until it slides into the under-cut groove on the right side of the frame, thus completing the mount assembly.

Fig. 9 is an enlarged sectional view of the assembled mount as shown in Fig. 8, illustrating how the mount may be disassembled by the application of a slight upward force at the point shown by the arrow, which slight force may be applied by the finger or by an object, thus disengaging the right-hand end of the insert from the corresponding groove of the frame and allowing said insert to be quickly slid out of the frame from left to right.

Like reference characters refer to corresponding parts throughout the drawing.

Referring now to the drawing, the present invention of a transparency mount consists of two pieces, a thermoplastic frame 10 and an insert 11.

The plastic frame portion 10 of the mount may be made by any one of various molding operations, such as injection molding, compression molding, transfer molding, etc., and the thermoplastic material of which the frame is made may be any such material which satisfactorily withstands the heat to which such a mount is liable to be subjected in any well-known type of still projector, and a material whose temperature and shrinkage characteristics are satisfactory when subjected to such heat.

The frame 10 is molded in one piece and the design of the frame is such that four grooves, 12, 13 and 14, which are right-angular in section and paralleling each outside edge of the frame, are provided by this one molding, such grooves making it possible to slidably engage the insert 11 in the frame to form a secure mount assembly. The manner in which these four grooves are provided in the design of the one-piece molded frame is one of the unique and novel features of the present invention. These four grooves, the two side grooves 12 and 13 and the top and bottom grooves 14, consist of an over-hanging section 22, 23 and 21 respectively and a cut-out portion 12, 13 and 14 respectively. The outer wall of the two cut-out portions 14 is flush with the corresponding side walls of the recess set in the frame 10, to allow insert 11 to smoothly slide into the grooves thus formed.

The four corners 15 of the recess set in frame 10 provide a positioning seat for the transparency film, this usage being shown clearly in Figs. 4 and 7. These right-angle corners are spaced a distance apart to conform to the rectangular outer shape of a film transparency, which in the present instance is a strip of 35 mm. photographic film, but said corners are spaced a slightly greater distance apart than the dimensions of the film in order to allow for expansion of the film when heated and in order to more readily seat the transparency film in the four corners of the recess.

The remaining walls of this irregular recess set in frame 10 are formed of angles, in the instance shown angles of approximately 45°. These angular walls of the recess cut across each of the corners 15 and connect the grooved portions 12, 13 and 14, giving rigidity to the frame where most needed.

The two such angular walls of the recess set in frame 10 which are on the right-hand side of the frame, which is the entering side for the sliding insert 11, each have a beveled edge 17, these beveled edges being provided so that the insert 11 may slide more easily into engagement with grooves 14 than would be the case were such beveled edges not provided.

Except for the four grooved portion set along each side of frame 10, the irregular recess set in said frame is of a uniform depth, forming a flat and thin section of said frame, the rear face of said thin recessed section being perfectly flush with and connecting to form a part of the rear face of the whole frame 10. This thin and flat section which forms the base of the irregular recess has a picture aperture 16 centrally located therein said picture aperture being of a size and shape to frame the picture area of the film transparency 20 when the latter is seated in the recess.

The periphery of the frame is smooth and unbroken on all four sides, as shown in Figs. 5 and 7, since all of the recessed and grooved portions of the design are set in a distance from all four edges of the frame, thus giving a finished and pleasing appearance to the mount.

The insert portion 11 of the transparency mount is stamped or die-cut from an opaque sheet material, and it is desirable that the material of which the insert is made have a certain amount of inherent rigidity, yet be flexible enough to allow it to be bowed and bent downward to slide into the groove on the right-hand side of the frame to effect the assembly of the two parts of the mount. Insert 11 may be made from any opaque material meeting these specifications, such as a good grade of coated or impregnated cardboard or sheet metal so treated as to have the proper flexibility combined with inherent rigidity. While the materials just cited may be used for insert 11 without departing in any way from the scope of the present invention, the preferred material for the insert in this instance is stamped or die-cut from sheet plastic of the right rigidity, and the insert will be referred to in this instance as being cut from such plastic sheet material. Whatever material is used for the insert, it must be opaque. This insert 11 has outside dimensions which approximate the dimensions of the recess set in frame 10, such recess formed by the four corners 15, the four angular walls of the recess and the outer surface of the cut-out portions 12, 13 and 14, but the outside dimensions of the insert 11 are slightly less than the dimensions of said frame recess, in order to allow said insert to be easily slidden into the recess of frame 10 for assembly of the mount. Insert 11 is shaped to be symmetrical about its vertical center-line, and since the front and rear face are identical, either face of the insert may be placed uppermost preparatory to inserting it into the frame, therefore either the right-hand or left-hand edge of the insert as shown may be used as the entering edge when sliding it into frame 10 for assembly of the mount. This insert 11 is provided with a picture aperture 18 which is adapted to frame the picture area of the film transparency 20 and which aperture 18 will register with the picture aperture 16 of the frame 10 when the insert is assembled in said frame 10 to form the assembled mount. The correct horizontal position of the insert for sliding it into the frame is visually apparent, since aperture 18 of the insert must register with aperture 16 of the frame.

In order that the transparency mount may be easily assembled, the proper proportions must be maintained in the thickness of the various elements of the frame portion of the mount in relation to the combined thickness of the insert 11 and the transparency film 20. To accomplish this, the dimension between the under face (or rear face) of over-hanging sections 22, 23 and 21 and the front or surface face of the flat thinned section forming the recess in the frame must be slightly greater than the combined thickness of insert 11 and film transparency 20. Thus the transparency film is held firmly and securely between the recess in the frame and the insert, yet has freedom for normal expansion in the plane of the film when subjected to heat as encountered in a film projecting machine for still pictures. An additional feature of the present invention which allows for natural expansion of the film when subjected to heat is provided by placement of the grooves 12, 13 and 14 near the four outer edges of the frame 10, so that when insert 11 is engaged in these four grooves any compressive force resulting from the engagement of these two parts of the mount is exerted outwardly from the four edges of the transparency film, and only sufficient compressive force is transmitted to the film to hold it flat and secure without any binding action. Placing of the grooves in the frame near the outer edges of said frame also allow the frame to be lighter in weight by providing a greater recessed area in said frame than has been provided by previous practice.

The mount is assembled by placing the film transparency 20 in the frame 10, the corners of the transparency film resting in corners 15 of the frame. Insert 11 is then slidden from right to left into the recessed area of frame 10 until it engages grooves 14 and is then guided in its sliding action until the left-hand edge of the insert engages groove 12, at which point the sliding movement of the insert is completed. Now the remaining right-hand edge of the insert is still free, and to finish the mounting operation this edge is bowed and bent downward to slide easily into the remaining groove 13, thus completing the mount assembly. This final operation of bending and sliding the remaining edge of the insert into groove 13 is made very easy and simple because the area of the over-hung section 23 of groove 13 which engages the edge of the insert is very small, just enough to prevent accidental disengagement, but small enough to make for ease and rapidity of engagement and disengagement of the insert edge into the groove. The areas of the over-hung sections 21 and 22 which engage the other three edges of the insert are much greater than this minimum over-hung area provided by 23 for the engagement of the insert.

The illustration in Fig. 6 shows the rear face of the assembled mount and indicates the manner in which grooves 12, 13 and 14 are so designed as to be molded in the one unit of frame 10. This view shows in particular the precise aspect of these grooves as seen from the rear, and shows the small areas of the rear face of insert 11 which are visible within the outline of each groove, and the manner in which the insert edges almost completely cover the under side of over-hung sections 21, 22 and 23 of frame 10, except in the small section of the insert which is broken away to better illustrate the construction of this part. This rear face of the mount is perfectly flat and smooth except for the areas of the four grooves and the picture aperture 16 through which the picture area of film transparency 20 may be seen.

One of the greatest difficulties to be overcome in a mount of the type presented in this invention is clearly shown in Fig. 6. When the insert 11 is securely assembled into the frame 10 to form the completely assembled mount, small pin-point openings are visible at the extreme edge of each groove, these pin-points representing the juncture of the edges of the insert with the outermost edges of the open slits visible in Fig. 1, which are mandatory in the design of the frame in order to achieve grooved construction in a single unit molding. These small pin-point openings are shown in Fig. 6 by 24, 25, 26 and 27. However, the mount which is presented in the present invention overcomes this difficulty by the fact that these eight points 24, 25, 26 and 27 at which pin-points of light might show in projection are all placed so near the four outside edges of the frame 10 that the slide holder mechanism in any of the standard still projectors for transparency films of this type will completely cover these pin-point holes, so that the present mount will be completely opaque when the film is projected. If these small pin-point holes were not placed so far outward in the frame, however, if they had instead been placed nearer the picture aperture framing the transparency film, then in all likelihood they would show when projected through a standard still projector.

It will be readily apparent from the foregoing description of the assembly of the present mount that this whole process of mounting a film transparency permanently within the mount is accomplished quickly, in a few seconds of time. Likewise, the process of unmounting a transparency from a completely assembled mount may be accomplished just as quickly. While the transparency is assembled in the mount, however, it is held securely and permanently therein with no possibility of accidental displacement or disengagement from the assembled mount. No special skill is required of the person performing these mounting and unmounting operations, no special equipment for these operations is necessary, and no glueing, taping or other tedious steps in the assembly of the film mount are required.

In addition, the present mount is designed to be manufactured in large quantities at low cost since no assembly operations are required in the manufacturing process. The manufacturing procedures are automatic, requiring a mold for rapid fabrication of the molded plastic frame 10, and a die or other cutting tool for the rapid cutting of insert 11 from standard sheet material. The present mount thus produced by these two automatic operations is light in weight, presents a smooth and pleasing appearance, is more durable than most mounts used in previous practice and is ready for instant use.

Although I have shown and described certain specific embodiments of the invention, I am fully aware that many modifications thereof are possible. My invention, therefore, is not to be restricted except insofar as is necessitated by the scope of the appended claims.

Having thus described my invention what I claim and desire to be secured by Letters Patent of the United States is:

1. A transparency mount consisting of a frame molded of thermoplastic material and an insert which is made from a sheet material, the frame containing an irregularly shaped recess which provides the means to seat and position a transparency film therein, the depth of said recess being such as to seat said transparency film and to allow additional room for the insert portion of the frame to slidably engage four grooved constructions integrally molded in said frame, each of said grooved constructions being set in from and running parallel to each side of said frame and each groove being so formed as to have an over-hung section whose uppermost face is flush with the face of said frame, the remainder of each grooved construction being in the form of a slot which opens on the rear face of said frame, the outer side wall of each slot abutting the wall of the aforementioned recess and the inner side wall of each slot forming the cut edge of the recess, so that the front elevational view of the frame will show each grooved construction as having a slit whose edges are formed by the cut edge of said recess and the outer edge of the over-hung section of said grooved construction, said frame portion and said insert portion of the mount also being each provided with a centrally-located picture aperture which both coincide in superposed relation in the assembled mount and jointly frame the picture area of the film transparency mounted therein.

2. As an article of manufacture, a mount for film transparencies comprising a frame molded of thermoplastic material, the front face of said frame being provided with an irregularly shaped recess, part of said recess being so shaped as to receive and position a film transparency and the remainder of said recess being adjacent to and connecting with four grooves which are set in from and run parallel to the four sides of the frame, the other part of the mount consisting of a separate insert which is stamped or die-cut from sheet material and is so shaped as to set snugly in said irregular recess of the frame when assembled, the aforementioned four grooves of the frame being so formed as to allow said insert to slidably engage three of said grooves and to engage the fourth groove by being bowed and bent downward thereby sliding into said fourth groove, the irregular recess and four grooves of the frame being provided in the single molded unit of said frame.

3. As an article of manufacture, a frame for a transparency mount of substantially rectangular shape molded of thermoplastic material, one face of said frame provided with an irregularly shaped recess and part of said recess being so formed as to receive and position a film transparency therein, the rear face of said recess being provided with an aperture centrally located in the frame and extending through to said recess and of a size and shape to frame the picture area of the transparency film which is to be seated in said recess, other parts of said recess connecting with four grooved constructions molded in said frame, each of said grooved constructions being set in from and running parallel to each side of said frame and each groove being so formed as to have an over-hung section whose uppermost face is flush with the face of said frame, the remainder of each grooved construction being in the form of a slot which opens on the rear face of said frame, the outer side wall of each slot abutting the wall of the aforementioned recess and the inner side wall of each slot forming the cut edge of the recess, so that the front elevational view of the frame will show each grooved construction as having a slit whose edges are formed by the cut edge of said recess and the outer edge of the over-hung section of said grooved construction.

4. A transparency mount consisting of a frame molded of thermoplastic material and an insert which is made from a sheet material whose characteristics enable it to lie perfectly flat in an inert state and yet be flexible enough to be bent when desired, the said frame containing an irregularly shaped recess which provides means to seat and position a transparency film therein and said frame also containing four integrally molded grooves, each groove set in from and running parallel to each side of said frame, three of the grooves being designed to allow the insert portion of the mount to slide into secure engagement with said grooves, and the fourth groove providing means for the final assembly of said mount by the process of bowing the remaining free edge of said insert and sliding it downward into locking engagement with said fourth groove, all four grooves being placed so near the outer edges of the frame that when they are engaged with the insert portion to form the assembled mount any pin-point holes visible in the assembled mount will not show when said mount is projected through most standard film transparency still projectors, because the slide holder mechanism of said projectors will completely cover those areas of the mount in which said pin-point openings are located, the aforementioned frame portion and insert portion of said mount also being each provided with a centrally-located picture aperture which both coincide in superposed relation in the assembled mount and jointly frame the picture area of the film transparency mounted therein.

JOHN NELSON WILLIAMS.

REFERENCES CITED

The following references are of record in the file of this patent:

UNITED STATES PATENTS

| Number | Name | Date |
| --- | --- | --- |
| 1,474,174 | Segall | Nov. 13, 1923 |
| 1,547,120 | Hamilton | July 21, 1925 |
| 2,166,641 | Perera et al. | July 18, 1939 |
| 2,292,312 | Wittel et al. | Aug. 4, 1942 |
| 2,362,434 | Fitch et al. | Nov. 7, 1944 |